(12) United States Patent
Morimoto

(10) Patent No.: US 9,109,339 B2
(45) Date of Patent: Aug. 18, 2015

(54) CUTTING DEVICE AND A METHOD FOR CUTTING A PILE

(71) Applicant: MOTOCUT OY, Kerava (FI)

(72) Inventor: Teppei Morimoto, Kerava (FI)

(73) Assignee: MOTOCUT OY, Kerava (FI)

(*) Notice: Subject to any disclaimer, the term of this patent is extended or adjusted under 35 U.S.C. 154(b) by 0 days.

(21) Appl. No.: 14/390,860

(22) PCT Filed: Apr. 11, 2013

(86) PCT No.: PCT/FI2013/050401
§ 371 (c)(1),
(2) Date: Oct. 6, 2014

(87) PCT Pub. No.: WO2013/153286
PCT Pub. Date: Oct. 17, 2013

(65) Prior Publication Data
US 2015/0096547 A1   Apr. 9, 2015

Related U.S. Application Data

(60) Provisional application No. 61/622,559, filed on Apr. 11, 2012.

(30) Foreign Application Priority Data

Apr. 11, 2012  (FI) ..................... 20125395

(51) Int. Cl.
*B23D 45/00* (2006.01)
*E02D 9/00* (2006.01)
*B23D 45/12* (2006.01)
(52) U.S. Cl.
CPC .............. *E02D 9/005* (2013.01); *B23D 45/006* (2013.01); *B23D 45/12* (2013.01)

(58) Field of Classification Search
CPC ....... B23D 45/006; B23D 45/12; E02D 9/005
USPC .................... 125/12, 16.01, 16.03
See application file for complete search history.

(56) References Cited

U.S. PATENT DOCUMENTS 2,807,921 A * 10/1957 Smith et al. ............. 451/441
3,056,267 A * 10/1962 McRee ................. 405/191
(Continued)

FOREIGN PATENT DOCUMENTS

FI   122291     11/2011
JP   07148607    6/1995
(Continued)

OTHER PUBLICATIONS

International Search Report for PCT/FI2013/050401, Completed by the European Patent Office on Jul. 29, 2013, 3 Pages.
(Continued)

*Primary Examiner* — Maurina Rachuba
(74) *Attorney, Agent, or Firm* — Brooks Kushman P.C.

(57) ABSTRACT

A cutting device for cutting a pile, including a body part, for connecting the cutting device to a working machine and a gripper attached to the body part to drive the cutting device around the pile to be cut, the gripping means having at least two opposite gripping parts to obtain a grip from the pile and to release the gripper from the grips. The cutting device includes at least two sawing parts arranged to move to a sawing position and to a secure position, and the cutting device having a saw connected to the sawing parts to perform sawing operation when at least one sawing part is in the sawing position, and the cutting device includes elastic means to adapt to forces, which arises during sawing movement of the a saw. The saw is arranged to move during the sawing movement substantially horizontally to the pile being cut.

16 Claims, 6 Drawing Sheets

(56) References Cited

U.S. PATENT DOCUMENTS

Figure 1:
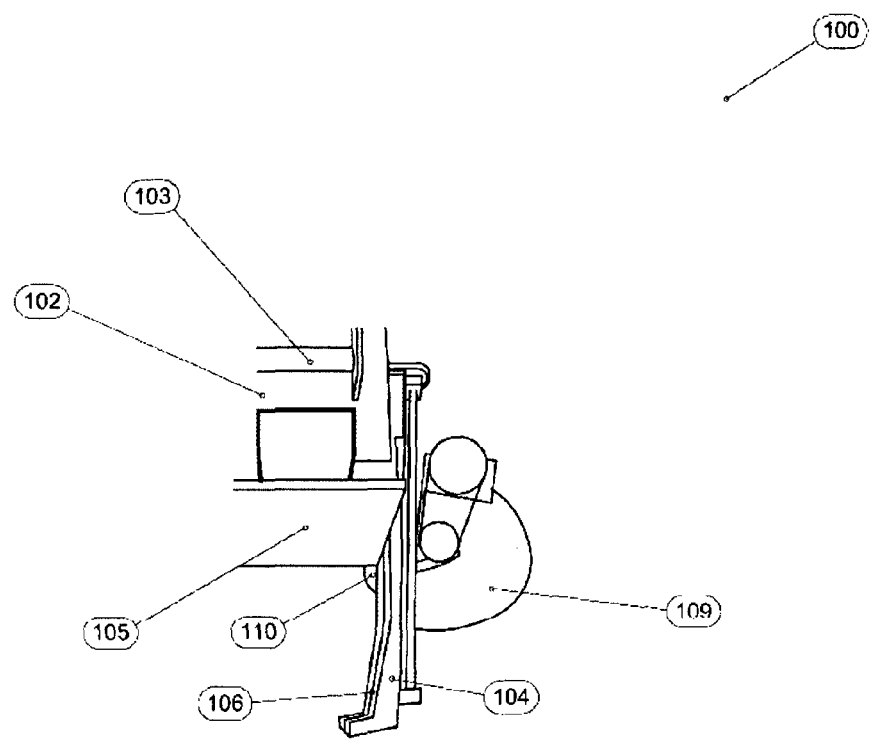

| | | | |
|---|---|---|---|
| 4,124,015 A * | 11/1978 | Isaksson | 125/23.01 |
| 4,144,867 A * | 3/1979 | Wachs et al. | 125/14 |
| 4,168,729 A * | 9/1979 | Tausig et al. | 30/228 |
| 4,197,828 A * | 4/1980 | Schellhorn | 125/23.01 |
| 4,233,954 A | 11/1980 | Visser | |
| 4,318,391 A | 3/1982 | Wachs et al. | |
| 4,368,720 A * | 1/1983 | Destree | 125/14 |
| 4,979,489 A * | 12/1990 | Abbasov et al. | 125/23.01 |
| 5,025,803 A * | 6/1991 | van der Toorn | 125/23.01 |
| 5,139,006 A * | 8/1992 | Trudeau | 125/12 |
| 5,289,816 A * | 3/1994 | Rakowski | 125/23.01 |
| 2005/0194000 A1* | 9/2005 | Todack | 125/23.01 |
| 2010/0018514 A1 | 1/2010 | Wills, II | |
| 2011/0167975 A1 | 7/2011 | Boudreault et al. | |

FOREIGN PATENT DOCUMENTS

| | | |
|---|---|---|
| KR | 100711708 | 4/2007 |
| NL | 1018379 | 1/2003 |
| WO | 2004070120 | 8/2004 |
| WO | 2010006421 | 1/2010 |

OTHER PUBLICATIONS

Finnish Search Report for Application No. 20125395, Completed by the Finnish Patent Office on Feb. 1, 2013, 2 Pages.

* cited by examiner

CUTTING DEVICE AND A METHOD FOR CUTTING A PILE

CROSS-REFERENCE TO RELATED APPLICATION

This application is the U.S. national phase of PCT Application No. PCT/FI2013/050401 filed on Apr. 11, 2013, which claims priority to FI Patent Application No. 20125395 filed on Apr. 11, 2012 and claims the benefit of U.S. Provisional Application 61/622,559 filed Apr. 11, 2012, the disclosures of which are incorporated in their entirety by reference herein.

FIELD OF THE INVENTION

The invention relates to a cutting device for cutting piles and to a method for cutting piles. Especially the invention relates to a cutting device for cutting for example concrete piles, said cutting device being connected to a working machine.

BACKGROUND OF THE INVENTION

Piling is a common land reclamation technology and foundation practice to direct heavy load of a structure to solid soil, for example to bedrock. Nowadays in piling is most often used steel concrete or steel pipe piles, which stands better than for example wood hits form piling machines and conserve as rot-proof in the ground.

Amount of needed piles in a building site depends naturally on area of the building to be constructed. In bridge or road construction sites are needed approximately 300 piles. For example in a middle size flat building site are needed approximately 150 piles to pile the groundwork. Length of a single concrete pile is 3-15 meters, and if a need arises it can be lengthened. In the end of the piling work the pile standing in ground surface has to be cut to have suitable length in order to continue with other construction site works.

Cutting of the pile is operated as separate work process in the construction site, and the cutting is commonly performed by a separate cutting unit, which is ordered to construction sites in order to cut the piles. Cutting of a pile is physically very demanding work, which comprises manual work phases. In method according to the state of the art cutting of the piles is usually performed by first digging enough ground around the piles so that it is possible to measure cutting height of the piles in order to perform the cutting work of the piles in the next work phase. The cutting is performed by sawing and by wedging them in two, and then an excavator collects upper parts of the piles to carry them away from the construction site. After this ground surface is underdrained and ballasted for upcoming forming of foundry.

Because the piles are usually cut in amount of 30-80 piles, the cutting work phases have to performed for example 7-10 times in construction site of 300 piles, which takes time and is expensive, because meanwhile other works can not be performed before cutting work phases have been finalized. Both a measure man and pile cutter have to perform their work in watery and sinking excavation, that has certain work safety problems.

It could be possible to perform underdraining and ballasting before cutting of the piles to make work safety better, but then the cutting level is too near (usually about 5 cm) ballast surface, which makes cutting more difficult or even impossible, because prior art cutting of piles requires about 10 cm of cutting level from the ground surface. There are often also piles to be cut near excavators or so high that it is in practice impossible to perform cutting of piles. It can also be impossible to perform cutting of piles due to too watery, slippery and/or sinking excavators or due to less than 10 cm cutting level.

After sawing the final breaking of piles in two parts is performed according to the prior art by a wedge and by a sledgehammer. This work phase is physically demanding and requires separate tools.

In patent document FI122291 is presented one example of prior art cutting devices, which are connected to a working machine for cutting of piles. On the basis of preliminary search examinations this document clearly represents the closest prior art to the present invention. In document FI122291 is presented a cutting device, in which sawing means have been fixed to gripping means in order to move the sawing means longitudinally towards the gripping means. Patent document FI122291 does not present any embodiment to compensate extensions and forces, which the sawing means have to receive during sawing. The prior art drawback of said document is that sawing means suffer by loosing their sharpness substantially fast or even by breaking down.

SHORT DESCRIPTION OF THE INVENTION

An object of the present invention is to accomplish an advanced cutting device which solves completely or partly the prior art problems described above. This is achieved by a cutting device for cutting a pile, comprising—a body part, which comprises means for connecting the cutting device to a working machine, and the cutting device comprising gripping means attached to the body part to drive the cutting device around the pile to be cut, said gripping means comprising at least two opposite gripping parts to obtain a grip from the pile to be cut to hold on to the pile, to obtain a grip from the pile to be cut to move the pile away, and to release the gripping means from said grips. The cutting device comprises sawing means arranged to move to a sawing position and to a secure position via the gripping means, and the cutting device comprises said sawing means to perform sawing operation when the sawing means are in the sawing position, and the sawing means comprised by the cutting device are arranged in the sawing motion to reciprocating motion essentially horizontally as to the pile to be cut and longitudinally as to the gripping parts of the gripping means when cutting the pile, and the cutting device comprises elastic means to adapt to forces, which arises during sawing movement of the sawing means, and to accomplish sawing movement which also deviates from the longitudinal sawing movement, said elastic means adapting to forces, which arises during the sawing movement of the sawing means in order to prevent the sawing means from damaging.

In one embodiment according to the present invention the sawing means can be arranged to reciprocating motion longitudinally as to the gripping parts of the gripping means when cutting the pile, said elastic means accomplishing also sawing motion, which deviates from said longitudinal direction.

In another embodiment according to the present invention motion of the cutting device or of part of the cutting device as to the pile can be circling motion of the cutting device or of part of the cutting device round the pile to be cut. In this embodiment the cutting device can comprise rolling means connected to the body part and to the gripping means in vertical direction arranged to pairs one upon the other, and the circling movement of the cutting device as to the pile to be cut is generated by operation of the rolling means.

In one embodiment of the present invention the cutting device can comprise detectors arranged to the gripping means, body part or sawing means in order to determine sawing depth of the sawing means.

In one embodiment according to the present invention the cutting device can comprise hydraulic means, pneumatic means, or at least one electric motor as means for operating the sawing part and/or the sawing means of the sawing part, and according to one further embodiment the cutting device can comprise a hydraulic cylinder for generating different positions of the gripping means.

An object of the present invention is also a method for cutting a pile, in which method is connected a cutting device to a working machine, is driven the cutting device around the pile to be cut, is obtained a grip from the pile to be cut by gripping parts to hold on to the pile, is obtained a grip from the pile to be cut by gripping parts to move the pile away, and is released the gripping means from said grips. In the method is used sawing means arranged to move to a sawing position and to a secure position, is performed sawing operation by the sawing means comprised by the cutting device, when the sawing means are in the sawing position by moving the sawing means to reciprocating motion essentially horizontally as to the pile to be cut and longitudinally as to the gripping parts by adapting by utilizing elastic means to forces, which arises during sawing movement of the sawing means, to accomplish sawing movement which also deviates from the longitudinal sawing movement, said adaptation being performed in order to prevent the sawing parts from damaging.

The method according to the present invention is characterized by that presented in the characterizing part of the patent claim 9.

According to one embodiment of the invention method according to the present invention comprises the cutting device according to the present invention and at least next method steps:
  connecting the cutting device to the working machine,
  arranging the gripping means to obtain a grip at desired high level of a pile to be cut,
  arranging sawing parts to sawing position, and starting sawing means,
  arranging the cutting device or a part of the cutting device to an essentially horizontal movement as to the pile to be cut,
  detecting desired sawing depth of the sawing means,
  moving the sawing parts to security position and stopping the sawing means,
  lifting the cut pile part away by using also the working machine.

According to one embodiment of the invention in the method according to the present invention for cutting a pile arranging of the cutting device or a part of the cutting device to move as to the pile to be cut is arranging of the sawing parts to reciprocating movement longitudinally as to the gripping parts of the gripping means. According to another embodiment of the invention arranging of the cutting device or a part of the cutting device to move as to the pile to be cut is arranging of the cutting device or a part of the cutting device to move circularly as to the pile to be cut.

Utilization of the cutting device and method thereof according to the present invention is based on many features. The cutting device according to the present invention is small and lightweight device, which is connectable to different working machines used in construction sites, such as for example an excavator, a pile-driver and a crane comprising a boom. Said working machine comprises utensils integrated to the working machine or utensils, which are connected to the working machine. The utensils can be for example a hydraulic unit supplying power to the cutting device according to the present invention. The cutting device and the method thereof is also fast, effective, cheap and reliable device, which can be utilized in every size of construction or building sites, and which also increases work safety of cutting work process.

The invention enables that cutting of piles can be performed straight after pilework without separate cutting work group, because the cutting device according to the invention can be included to devices normally used in construction sites. This spares time and economical costs because other works can be continued. The invention also diminishes complexity and physical requirements of cutting work process thus increasing effectiveness and work safety as compared to traditional handmade cutting of piles. Cutting of piles can be performed in small amounts as the pilework goes on even simultaneously with the pilework.

Because the invention can increase lifetime of cutting saws, for example lifetime of cutting blades, and prevent blades from sticking to the pile to be cut, cutting of the pile is more safe and effective. Cost savings are achieved due to longer lifetime of the sawing means and due to better reliability of a successful cutting work process. The invention enables to cut piles also from difficult locations, such as from edges of excavations, from high locations, and from very close to ground surface, because the cutting device according to the invention does not require real cutting height markings. The piles to be cut can also be very low, for example 2 cm-7 cm, and preferably about 3 cm-5 cm, and they can have many sizes, forms and they can also be made of many materials, such as for example steel-armoured concrete piles and round steel or concrete piles.

The cutting work can also be performed in very difficult ground surface conditions (watery, slippery, sinking, etc), because the cutting can be operated from the working machine. The cutting device according to the invention also enables to take away the pile, which has been cut, immediately from disturbing other construction site works, which also makes work safety better and enables better progression of other construction site works.

The term "pile" related to this invention can mean many kind of piles used in pilework into ground, for example steel-armoured concrete piles, steel piles, wood piles, micro piles, in situ piles, and other piles used for reformation of soil and for supporting of ground. Length and thickness of said piles can vary, and they can have rectangular, circular, or some other shape in cross section.

The term "working machine" related to this invention can mean many kind of working machines used in building or construction sites, such as for example an excavator, a pile-driver, a tractor and different kinds of cranes comprising a lifting and descending boom. Said working machine comprises utensils integrated to the working machine or utensils, which are connected to the working machine. The utensils can be for example a hydraulic unit supplying power to the cutting device according to the present invention to move said boom comprised by the working machine.

SHORT DESCRIPTION OF THE DRAWINGS

Preferred embodiments of the present invention are described more detailed by referring to related figures, in which:

FIG. 1 presents a cutting device according to one embodiment of the present invention from an up front view.

Figure 2:
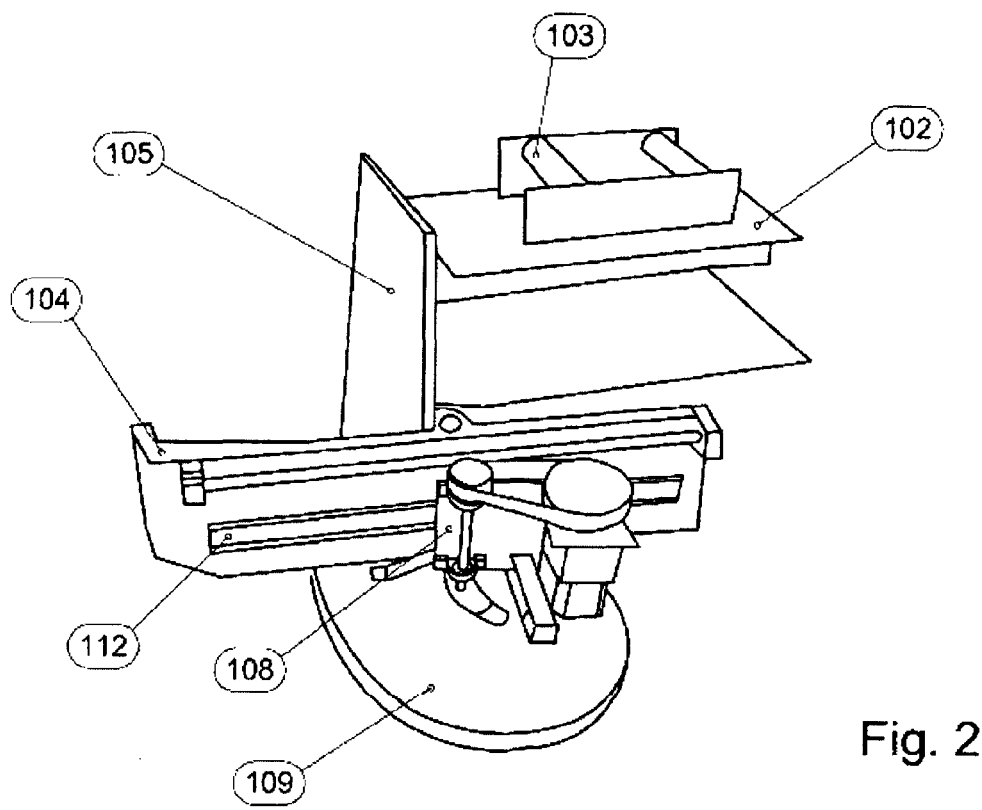

FIG. 2 presents a perspective view from a cutting device according to one embodiment of the present invention.

Figure 3:
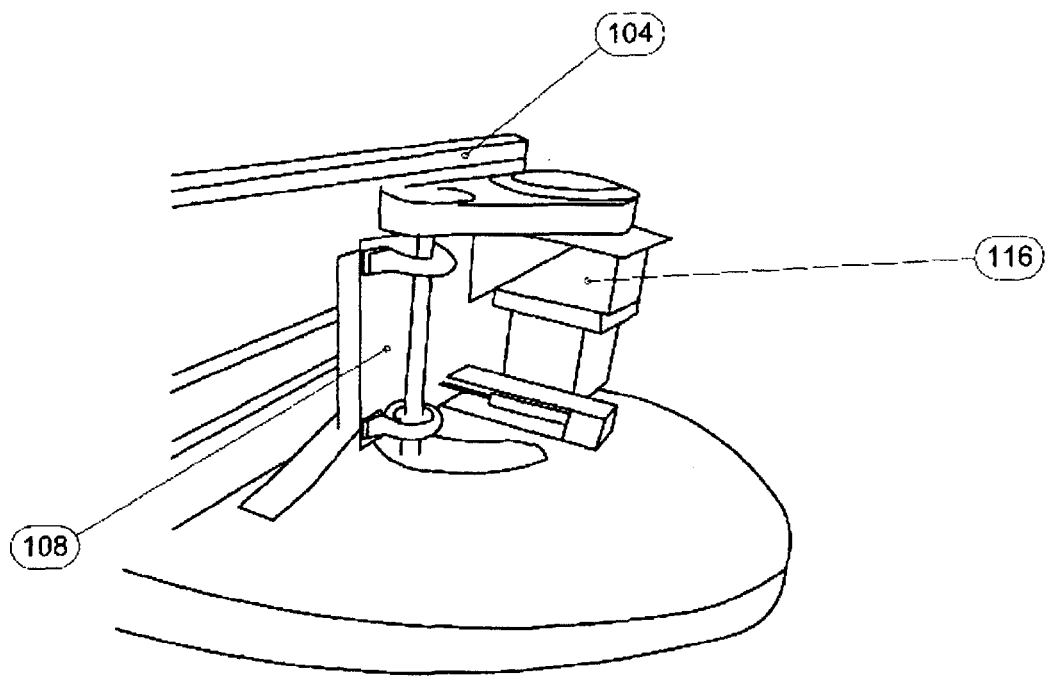

FIG. 3 presents a sawing part of a cutting device according to one embodiment of the present invention in sawing position.

Figure 4:
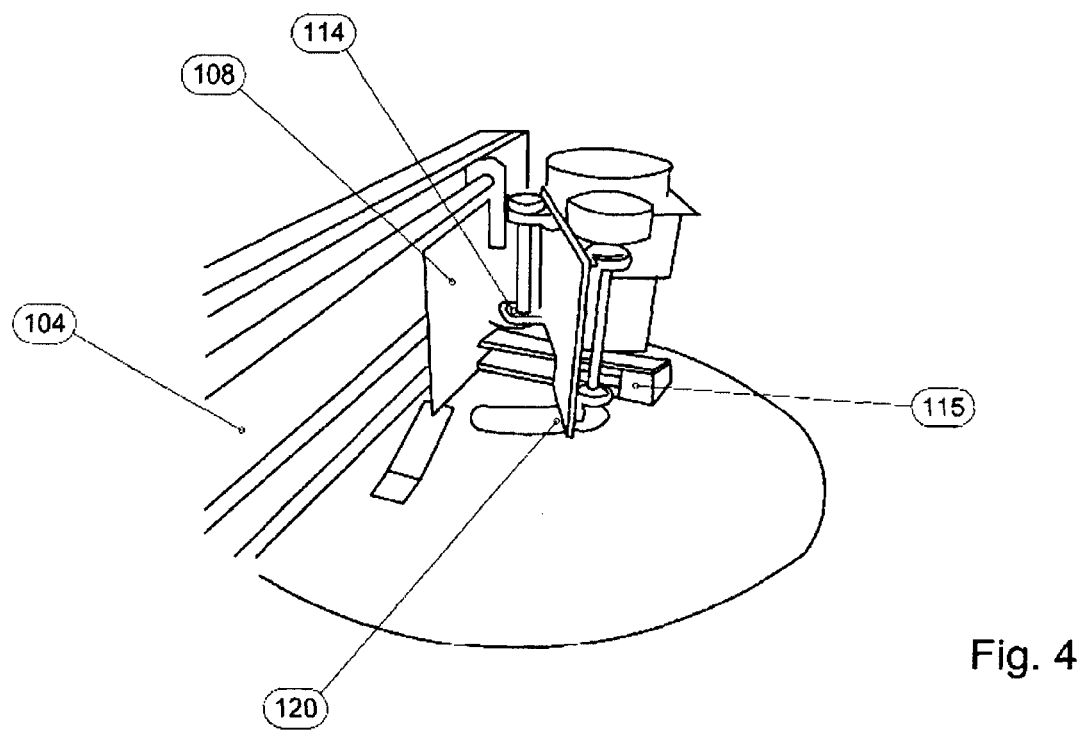

FIG. 4 presents sawing means of a cutting device according to one embodiment of the present invention, and elastic means connected to said sawing means.

Figure 5:
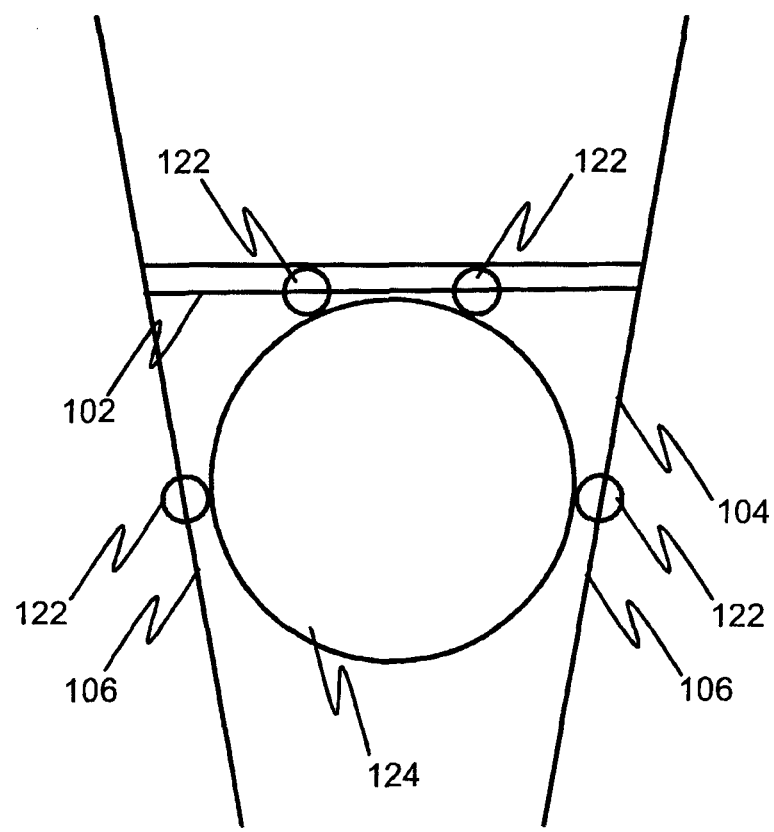

FIG. 5 presents an example of a cutting device according to another embodiment of the present invention from an up front view.

Figure 6:
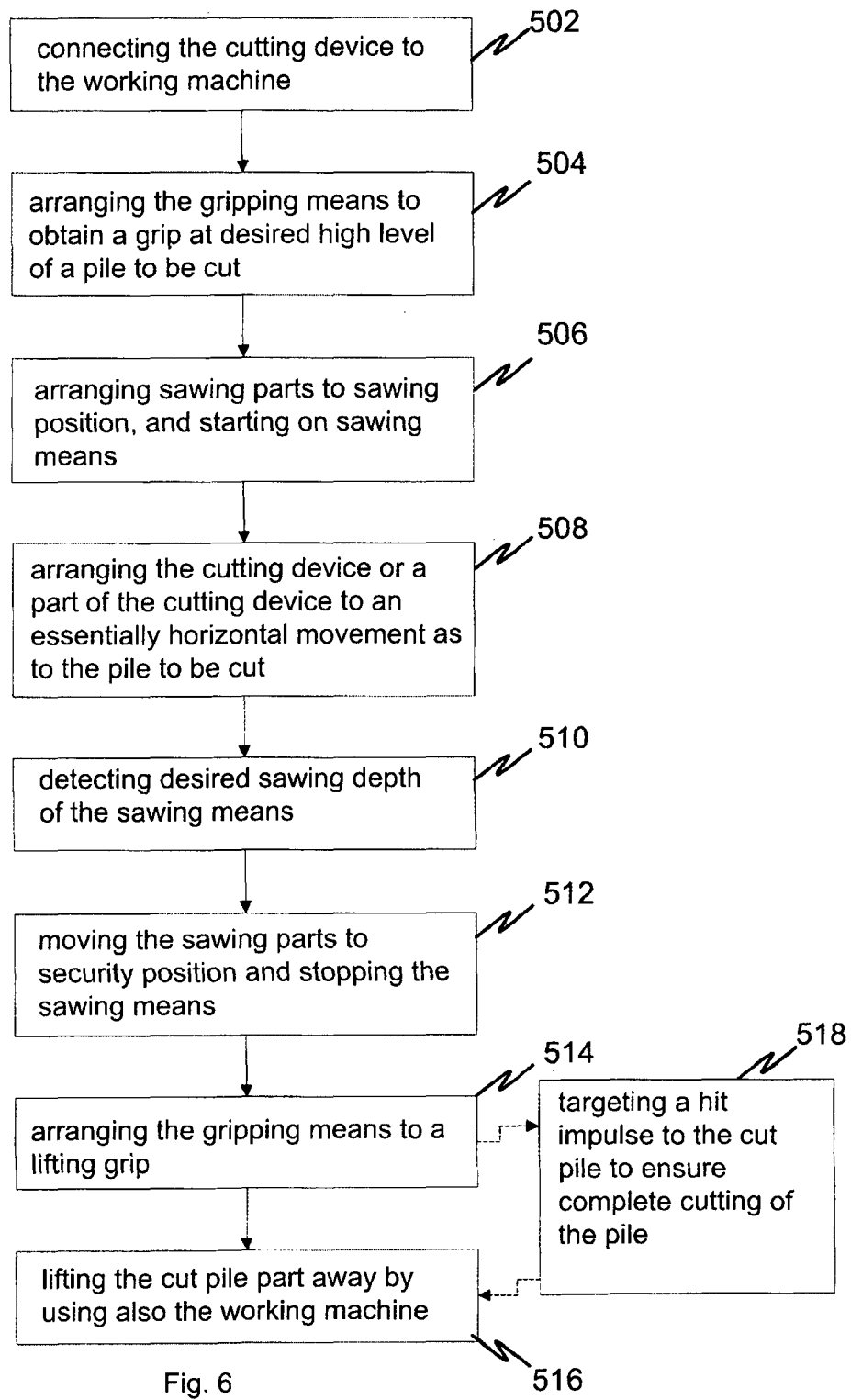

FIG. 6 presents a flow diagram of a method for cutting a pile according to one embodiment of the present invention.

DETAILED DESCRIPTION OF THE INVENTION

FIGS. 1 and 2 present a cutting device according to one embodiment of the present invention. A cutting device 100 for cutting a pile comprises a body part 102, which comprises means 103 for connecting the cutting device to a working machine. The cutting device 100 comprises gripping means 104 attached to the body part 105 to drive the cutting device around the pile to be cut, said gripping means 104 comprising at least two opposite gripping parts 106. The cutting device 100 further comprises at least two sawing parts 108 arranged to move to a sawing position and to a secure position, and the cutting device 100 comprises sawing means 110 connected to the sawing parts 108.

The cutting device 100 is preferably manufactured of long-standing material, such as for example of steel or iron, to obtain pressure force of the gripping means 104 that is strength enough to lift cut pile part away. Anyway the cutting device is so manufactured that total weight of the cutting device makes the cutting device lightweight and easy to handle.

A control plate 105 can be accomplished to the body part 102, which control plate is positioned against the pile to be cut, when the cutting device is driven round said pile. The body part 102 can also comprise connecting means 103 to connect the cutting device to a working machine. According to one embodiment of the invention the connecting means 103 are for example at least one tie rod to connect the cutting device to a boom of the working machine. Shape and size of the connecting means 103 can vary depending on which type of working machine the cutting device is to be connected. In one embodiment of the invention the connecting means 103 are arranged to be quickly opened for example by some kind of a quick release fastener arrangement.

Furthermore according to one embodiment of the invention the connecting means 103 are so arranged that the cutting device 100 can be partly released from the working machine for example by wire rope(s) or cable(s) or by some other suitable means, which enable the cutting device to move freely and also enable the cutting device to be quickly connected back to the working machine from said partly released operation condition.

The gripping means 104 are preferably connected to the control plate 105. In some embodiments of the invention also other parts of the cutting device can be located in the body part 102. These other parts can be for example means for operating the cutting device, such as hydraulic means and/or electric motor(s).

The cutting device according to the invention can be attached to many kind of working machines used in building or construction sites depending on the embodiment, such as for example an excavator, a pile-driver, a tractor and different kinds of cranes comprising a lifting and descending boom. It is apparent to a person skilled in the art that the cutting device can be connected also to other kind of machines or devices comprising a boom to move the cutting device near a pile to be cut and to lift the cut pile part away.

In the embodiments according to the FIGS. 1 and 2 the gripping means 104 comprise at least two opposite gripping parts 106 to obtain a grip from the pile to be cut to hold on to the pile so that the pile is between the gripping parts 106. The gripping means can be arranged to obtain a grip from the pile to be cut to hold on to the pile during cutting, to obtain a grip from the pile to lift the cut pile away, and to release the gripping means 104 from the grips. In the embodiments in which there are arranged more than single opposite gripping parts to the gripping means, first gripping parts can be arranged to obtain a grip from the pile to be cut to hold on to the pile during cutting, and second gripping parts can be arranged to obtain a grip from the pile to lift the cut pile part away. Then the gripping parts can be arranged within each other or in layers.

The grip of the gripping means to hold on is preferably smaller in force than force of the lifting grip, said smaller force being for example about 200 N-600 N and preferably about 300 N-500 N pressing force directed to two opposite sides of the pile to be cut. The function of the grip to hold on is only to stabilize the gripping means with the pile so that the sawing parts can be safely moved from security position to sawing position, and the sawing operation can be started. By this way the gripping means do not cause torsion forces to the pile to be cut, and cutting of the piles can be performed safely without damaging the sawing means, and vibration from a motor of the working machine cannot transfer through the boom and the gripping means to the sawing means, which could damage the sawing means. Also more powerful grips to hold on can be used so that maximum force of the grip to hold on is force which prevents vibration of the motor of the working machine from transferring to the sawing means to disturb their operation. Gripping force of the gripping parts 106 can be so controlled that vibration of the working machine do not transfer to the sawing means, which could deteriorate performance of the sawing means.

The lifting grip of the gripping means is more powerful than the grip to hold on, being for example about 1000 N-15 000 N, and preferably about 1 500 N-10 000 N pressing force directed to two opposite sides of the pile to be cut. The gripping means 104 are arranged to accomplish forceful and sure grip of the cut pile part in order to lift the pile part away. Weight of the cut pile part can be even over 500 kg, and when the lifting is operated from the below side of the cut pile, torsional forces can be heavy, and thus grip force for lifting must be formed forceful enough. According to one embodiment force of the lifting grip is controllable according to pile part to be lifted. Said control can be arranged to be performed by the user, when the user estimates needed force of the lifting grip or the control can be performed automatically for example by using sensor(s) and control system arranged to the cutting device.

Cut pile part is lifted away usually by the working machine to which the cutting device is connected. Pressing grip force is preferably formed by means arranged to the cutting device, said means being for example a hydraulic cylinder. It is apparent to a person skilled in the art that grips can be arranged also by other kind of means. In one embodiment according to the invention the cutting device comprises two hydraulic cylinders arranged separately to two gripping parts, the first hydraulic cylinder arranging hold on grip and the second hydraulic cylinder arranging lift grip to the first gripping parts, and the third hydraulic cylinder arranging hold on grip and the fourth hydraulic cylinder arranging lift grip to the second gripping parts. By this solution can be achieved mechanically better moving of gripping parts and better functionality in forming gripping force. The gripping parts can be arranged to release the grip, when pressing force directed to a pile ceases, and the gripping parts of gripping means can move even to maximal distance from each other. When gripping means have been released and moved to the maximum distance from each other, the cutting device according to the invention is easy to be positioned around a pile to be cut also without manual control. Said maximum distance can vary for example depending on diameter of the piles to be cut, which diameter normally varies between about 20 cm-45 cm. Said maximum distance between the gripping parts is preferably chosen to be some centimeters more than diameter of the piles to be cut. The maximum distance between the gripping parts can be preferably chosen so that it is for example about 2 cm-8 cm, and preferably about 3 cm-5 cm more than width of the pile type to be cut to which the device is designed.

In one embodiment according to the invention maximum distance between the gripping parts is controllable on the basis of the pile type to be cut. Distance between the gripping parts can be changed by using for example mechanical means or hydraulic means to perform necessary movements. This kind of distance control can be performed by control means arranged to the cutting device according to the invention, said control means being for example mechanical or hydraulic means for controlling distance of the gripping parts of the griping means. In one embodiment the control means can be arranged to control distance of the joints between the gripping parts 104 and body part of the cutting device so that said distance becomes suitable to piles of different diameters.

Said controllability of the distance can be based for example on manual distance control by the user or on automatic distance control to change distance between the gripping parts by utilizing sensor measurement information of the pile diameter obtained by sensor or sensors, which measure(s) diameter of the pile to be cut. Same means used to change distance between the gripping parts can also be used to form forceful enough and reliable grip from the pile by the gripping parts. There can also be other variations in embodiments according to the invention. For example there can be arranged different gripping parts to form grip to hold on the pile to be cut and to form grip to lift a cut pile part away.

In one embodiment control of the distance between controllable gripping parts can be arranged by moving both gripping parts so that distance between the gripping parts becomes bigger or smaller. In another embodiment control of the distance between the gripping parts can be arranged by moving only one gripping part so that distance between the gripping parts changes. As mentioned above, the control can be performed by any means suitable for distance control, such as for example by mechanical or hydraulic control means. It is apparent for a person skilled in the art that the control means are attached to both gripping parts in the embodiments in which both gripping part is arranged to be moved, and only to one gripping part in the embodiments in which only one gripping part is arranged to be moved in order to change distance between the gripping parts.

According to one embodiment the control means, which are arranged to control one gripping part or both gripping parts, are also used to obtain the hold on grip of the gripping means. According to another embodiment the cutting device according to present invention comprises the above presented single gripping parts to obtain lifting force to the pile to be cut, and other gripping parts to obtain hold on grip to the pile to be cut, and distance between said other gripping parts is arranged to be controlled. As mentioned above same means can be used to control distance and to obtain the hold on grip.

In one embodiment of the invention sawing parts 108 can be attached to the gripping parts 106 of the gripping means 104. In one embodiment the sawing parts 108 can be arranged below the gripping parts 106, for example 1 cm-2 cm from a lower edge of the gripping part. This enables sawing means of the sawing parts to perform sawing of a pile very near ground surface. Ground clearance of the cutting device according to the invention is preferably for example 2 cm-8 cm, and most preferably about 3 cm-5 cm. Height of the gripping means can vary much depending on the embodiment, but preferably the gripping parts are made high enough for example to enable attachment of rails to the gripping parts, said rails being for the reciprocating movement of the sawing means. Height of the gripping parts can be for example about 5 cm-45 cm, and preferably about 20 cm-25 cm, which enables for example fastening of the rails to the gripping parts. Height of the pile to be cut is to be at least for example about 2 cm-7 cm, and preferably at least about 3 cm-5 cm, so that the gripping parts of the device according to the present invention obtain a tight grip of the pile to be cut, and the pile can be cut.

The sawing part 110 is arranged to move substantially longitudinally back and forth as to the gripping parts of the gripping means when the sawing part 108 is in a sawing position. In the embodiments of FIGS. 1 and 2 said movements are arranged by rails 112 and a screwing rod 118 by control of which the sawing part is arranged to the reciprocating motion in the sawing position along a lower part of the gripping means for example by a hydraulic motor or by an electric motor. It is apparent to a person skilled in the art that the movements of the sawing part can be arranged also by other means such as instead of the rail can be used bearing-mounted wheels and an open channel section, which is opened on one side, said arrangement thus accomplishing a rail like structure enabling the sawing part to move longitudinally. The screwing rod to move the sawing part can be replaced for example by cable operated or chain driven operation or by using hydraulic or pneumatic cylinders.

The sawing means 110 are preferably arranged to the sawing part so that that the sawing part 108 protects the sawing means 110 for example by covers 109 located on upper and/or below side of the sawing part 108, said covers preventing other objects from getting in touch with the sawing means. The sawing means can be all possible means to saw steel or reinforced concrete such as for example a diamond wheel, a chain saw with diamond segments, water cutting methods, chipping drilling cutting and a hard burr. Especially cutting of circular steel pipe piles is preferably performed by the hard burr similar as the sawing means, because it does not cause sparkles during the cutting.

In FIG. 3 is presented the sawing part of the cutting device in a safety position, in which the sawing part 108 is arranged to move to an extreme position to the body part side of the gripping means 104, when the sawing part 108 and sawing means 110 are safe below the body part, and they can not be broken when a cut pile part is lifted away. In one embodiment of the invention the sawing part is arranged to the reciprocating motion in the sawing position for example along a gripping part 106 of the gripping means 104. The sawing means are activated at the same time. Depending on the embodiment the cutting device can comprise for example a hydraulic or a pneumatic motor to supply the use of the sawing means 110. It is apparent to a person skilled in the art that also other kinds of suitable means can be used to provide the operation of the sawing means. As presented in the embodiment of FIG. 3 the motor used by the sawing means 110 is preferably attached to the sawing part 108.

In FIG. 4 is presented sawing means 110 according to the present invention and elastic means 114, which prevent powerful pressing or hit force from directing to the sawing means and thus prevent the sawing means from damaging. The elastic means 114 are adapted to the sawing means so that they allow the sawing means to move away as to the gripping means, which means in one embodiment of the invention into the sawing part 108, and the elastic means 114 return the sawing means to sawing position, when force targeted to the sawing means is less than for example about 50 N-150 N, and preferably about 70 N-100 N. Then cutting of the pile is performed only by reciprocating movement of the sawing part 108 and by sawing movement of the sawing means, which is for example circling movement of a diamond wheel, and the sawing means are prevented from damaging during cutting operation. When other than the diamond wheel is used as the sawing means, for example a hard fragment wheel or a fibre wheel, which are especially used for cutting round piles or pipes, force targeted to the sawing means can be less than presented above, for example about 30 N or more. The used elastic means can vary depending on the embodiment, but preferably can be used a pushing and/or pulling mechanical spring or gas spring. It is apparent for a person skilled in the art, that as elastic means can be used also some other suitable means.

According to one embodiment to the gripping means is further arranged inductive detectors and/or according to another embodiment to the body part is further arranged a detector, and on the basis of said detectors can be detected, when the sawing means have reached maximum depth in the pile to be cut, and the sawing can be stopped. Also to the sawing means can be arranged detectors to detect extreme positions of the sawing means so that they will not get in touch.

The elastic means 114 adapt to the movements of the sawing means and allow the sawing means to move away from the gripping means for example inside to the sawing part 108. In the embodiments according to the invention can be used various elastic means 114. Preferably the elastic means comprise for example a pushing and/or pulling mechanical spring or a gas spring. The detector can also be a mechanical arrangement such as for example in FIG. 4 a hole 120 arranged to the sawing means. The elastic means 114 and motor used by the sawing means are operationally connected via said hole to the sawing means. The nearest edge of the hole 120 as to the gripping means 104 also prevents the sawing means from moving too near to each other.

In one embodiment of the invention the sawing operation of the sawing means is arranged to be so automatic that detectors are arranged to detect for example steel reinforcements located in corners of a steel concrete pile and depth of the sawing is controlled on the basis of said detection. In one another embodiment sawing is controlled manually for example so that the user receives from corner detectors and from depth detectors indication of that corner steel reinforcements are cut and then the sawing can be ended. Cutting of corner steel reinforcements is crucial in order to cut the entire pile. Depth of the sawing can be for example 10-12 cm, which leaves for example diameter of 10 cm of concrete to the middle of the pile.

In one embodiment of the invention the cutting device further comprises control means in order to receive for example information on maximum depth of the sawing means from the detector(s), and in order to stop the sawing means on the basis of the received information and to drive the sawing means to a safety position. The control means preferably comprise a processor based control arrangement.

According to one embodiment a pile can be cut also from another sawing direction after first sawing by arranging the cutting device around the pile to 90 degrees angle to whichever direction from the first sawing direction. This kind of sawing from both directions is preferred for example in the sawing of very short piles. In longer piles, in which the cut pile part is about one meter or longer, the complete cutting of the piles can be also performed by a lifting grip, on the basis of the shearing force caused by the cut pile part to the cutting area.

According to one embodiment the cutting device according to the present invention can also comprise a cooling arrangement connected to the sawing means to cool the sawing means during sawing. Depending on the embodiment the cooling arrangement can comprise a water arrangement, but it is apparent for a person skilled in the art that also other kind of cooling arrangements can be utilized to cool the sawing means. The cooling arrangement is preferably located to the body part of the cutting device and connected from the body part to the sawing means for example by tubings. The cooling arrangement can be integrated to the cutting device according to the present invention or it can be a separate arrangement, which is connectable to the cutting device.

FIG. 5 presents an exemplary overview figure of a cutting device according to another embodiment. This embodiment is specifically useful to cut round piles or pipes. Wheels or rolls 122 have been arranged to the body part 102 and/or to the opposite gripping parts 106 of the gripping means of the cutting device according to the present embodiment, said wheels or rolls being referred in this patent specification by a common name "rolls". Rolls 122 are preferably arranged in pairs so that a pair of rolls is located in layers in the cutting device. Amount of the rolls may vary depending on the embodiment, but preferably there have been located 1-2 pairs of rolls in the body part 102, and one pair of rolls to the each opposite gripping part. The rolls positioned to the gripping parts 106 are arranged preferably so that the lower roll settles near to the lower edge of the gripping part, anyway in such a way that operation of the sawing means is not disturbed, and the upper roll settles to the upper part of the gripping means, making a grip of the round shaped pile by the gripping means as tight as possible. The rolls located in the body part are positioned preferably to the same level as rolls positioned to the gripping means, but the rolls can also locate in the body part in a different level compared to the gripping means, depending on the embodiment, and any in such a way that the lower roll of the body part cannot locate lower than the lower roll of the gripping means.

The rolls are positioned to the body part and to the gripping means so that the pile or pipe to be cut is gripped in such a way that said pile or pipe settles tightly against the rolls. The rolls positioned to the gripping means are preferably positioned so that they settle to both sides of the pile or pipe to be cut to the widest side of the pile or pipe or to the front side of the pile or pipe as viewed from front of the pile or pipe. In the present embodiment of cutting round piles or pipes it is preferred to utilize a grip, which uses more strength to the pile or pipe to be cut than in the above embodiment, because the cutting device remains against the rolls around the pile or pipe to be cut, and the stronger grip enables to compensate especially torsion caused by the more heavy body part.

In one embodiment a position of the rolls arranged to the body part or to the gripping means can be changed in side direction so that as diameter of the pile or pipe to be cut changes the rolls can be positioned according to the new diameter. This feature can be accomplished for example by arranging fastening of rolls to the body part and/or to an essentially horizontal groove made to the gripping means, where the position of the rolls can be changed by utilizing a slipping movement or to fixed locations correspond for example the most common diameters of piles or pipes. Depending on the embodiment locations of each roll are arranged changeable or only a part of roll pairs such as for example roll pairs arranged to the gripping means.

At least one of the rolls 122, and preferably 2-4, are arranged as pulling rolls, and the other rolls are for example fit with bearings to enable as friction less rolling as possible. According to one embodiment all lower level rolls are arranged as pulling and all upper level rolls are fit with bearings. A motor is arranged to the cutting device or in connection to the cutting device in order to roll the pulling rolls.

When a round pile is cut with a cutting device according to the present embodiment the pile 124 to be cut is arranged between the gripping means 104 against the rolls 122 arranged to body part 102, and the gripping means are arranged to a grip around the pile 124, and the pile 124 remains to the gripping parts 106 and to the rolls 122 arranged to the body part 102. The fastening of the cutting device according to the present embodiment is arranged to be at least partly released from a boom of a working machine for example by means of a quick release fastener, and the cutting device stays in a grip position around the pile 124 to be cut. The cutting device is anyway preferably also after releasing from the boom connected to the working machine for example by hydraulic tubings and electric wire or in some embodiments by a separate wire rope, chain or rope. By means of above mentioned fastenings the cutting device can be later fastened again to the boom of a working machine or at least falling of the cutting device can be prevented after cutting of the pipe or pile.

When the cutting device grips the pile or pipe to be cut, the sawing parts can be moved from the security position to the sawing position, and the sawing means can be started (not presented in FIG. 5). When the sawing means are moved to a maximum sawing depth, the cutting device can be operated so that it moves horizontally around the pile 124 to be cut. Preferably said movement is for example 100 degrees to the clockwise direction and back, and 100 degrees to the anticlockwise direction, and back, but it is apparent to the person skilled in the art, that said movement can also start to the anticlockwise direction, and amount of degrees can vary, as long as the total cutting of the pile or pipe to be cut can be ensured. After cutting operation the cutting device can be fastened again to the boom of the working machine, after which the gripping means can be arranged to a lifting grip and the cut pile or pipe part can be lifted away.

The rolls are preferably made of long lasting suitable material, such as for example of steel, and a surface having better grip friction can be made to the rolls for example of rubber.

In the embodiments having separate gripping parts for a hold on grip and for a lifting grip, the rolls have been arranged to gripping parts performing the hold on grip, and the sawing means have been attached to said gripping parts.

Further, according to another embodiment, part or all of lower level rolls are arranged to a lower level than the sawing means. Then, especially in the embodiments, where all lower level rolls are in the lower level than the sawing means, also at least part of the gripping parts can be in the lower level than the sawing means, and the cutting device can comprise several gripping means, to which rolls are arranged, or a groove can be made to the gripping parts, and the sawing is arranged along said groove. This embodiment can enable steady position of the cutting device or the cut pile or pipe part even after cutting and before the cutting device is fastened back to the boom of the working machine to lift the cut part away.

In FIG. 6 is presented a flow chart according to one embodiment of a method for cutting a pile according to the present invention. In method step 502 the cutting device is connected to the working machine. This connection is performed by connection means 103 made to the cutting device, for example so that the working machine grips tie rods made to the cutting device. In method step 504 the gripping means 104 are arranged to take a grip at the desired high level of the pile to be cut. The cutting machine is moved around the pile to be cut for example so that the pile locates between the gripping parts 106 of the gripping means and a steering plate 105 locates against the pile. Thereafter the gripping means are assembled to take a grip for example by means of a hydraulic motor to stabilize the cutting device with the pile to be steady.

In a method according to one embodiment the connection between the cutting device and the working machine is at least partly released after the method step 504. Said releasing from the working machine enables for example cutting of round piles or pipes as the cutting device is released to move freely around the pipe or pipe.

In the method step 506 the sawing means 108 are arranged to a sawing position when the sawing means 108 are moved from an extreme position from an end side of the gripping means 106, said end side being near the body part 102, longitudinally forth along the gripping part of the gripping means to the front side of the steering plate 105. Then the sawing means 110 get in touch with the pile, and the sawing means 110 are started. Although as it has presented above that the sawing parts are moved to the sawing position at the same time as the sawing means 110 are started, there can be in some embodiments a small delay between the movement to the sawing position and the starting of the sawing means. Said delay can be for example 1 s-4 s, preferably for example about 2 s-3 s, and during said delay the sawing parts can move from the security position to the sawing position.

In method step 508 the cutting device or part of the cutting device is arranged to move essentially horizontally as to the pile to be cut, and in method step 510 is detected the desired maximum sawing depth of the sawing means. According to one embodiment the sawing parts are arranged to longitudinal reciprocating motion as to the gripping parts of the gripping means, for example by means of motors used by the sawing parts and by means of rails made to the gripping means. According to another embodiment the cutting device is arranged to circular movement around the pile to be cut, for example by pulling rolls arranged to the gripping means and/or to the body part. In this embodiment it is preferred to perform first the method step 510 and after it the method step 508 to enable as effective cutting as possible of a steel pile or a steel pipe, which pile or pipe is usually hollow.

In method step 512 after the sawing means 110 have reached the maximum depth the sawing parts 108 are moved back to the security position to the end side of the gripping means 104 near the body part 102, and the sawing means are stalled. Although as it has presented above that the sawing parts are moved to the security position at the same time as the sawing means 110 are stalled, there can be in some embodiments a small delay between the movement to the security position and stalling of the sawing means. Said delay can be for example 1 s-4 s, preferably for example about 2 s-3 s, and during said delay the sawing parts are stalled before their movement to the security position. Thereafter in method step 514 the gripping means are arranged to a lifting grip of the cut pile part. In the embodiments where the fastening of the cutting device is at least partly released, the cutting device can be fastened back to the working machine before said lifting grip.

If there are at the same time several piles to be cut, the method steps of 504-516 and 504-518 are repeated depending on the embodiment until all desired piles have been cut and lifted away.

As presented above, depending on the embodiment the method steps can be performed in different sequence, and in some embodiments the method comprises also other method steps.

Above is presented only some embodiments according to the present invention. The principles according to the invention can naturally be varied in the scope determined by the patent claims for example by details of the embodiments and by different applications.

The invention claimed is:

1. A cutting device for cutting a pile, comprising:
a body part, which comprises means for connecting the cutting device to an excavator, and the cutting device comprising gripping means attached to the body part to drive the cutting device around the pile to be cut, said gripping means comprising at least two opposite gripping parts to obtain a grip from the pile to be cut to hold on to the pile, and to release the gripping means from said grips, wherein the pile comprises angular shapes, and that the cutting device comprises sawing means on both sides of the pile to be cut arranged to move to a sawing position and from the sawing position to a secure position via the gripping means, and the cutting device comprises said sawing means to perform sawing operation when the sawing means are in the sawing position, and the sawing means comprised by the cutting device are arranged in the sawing motion to reciprocating motion essentially horizontally as to the pile to be cut and longitudinally as to the gripping parts of the gripping means when cutting the pile, and the cutting device comprises elastic means adapting to forces, which arises during the sawing movement of the sawing means in order to prevent the sawing means from damaging, said elastic means being arranged to accomplish also sawing movements which deviate from the longitudinal sawing movements, and the cutting device comprises said at least two opposite gripping parts to obtain a pressure force of the grip from the pile to lift the cut pile part away.

2. The cutting device according to the claim 1, wherein the cutting device comprises control means to determine diameter of the pile to be cut and to change distance between the gripping parts suitable for the diameter of the pile to be cut.

3. The cutting device according to the claim 1, wherein the motion of the cutting device or of part of the cutting device as to the pile is circling motion of the cutting device or of part of the cutting device round the pile to be cut.

4. The cutting device according to the claim 3, wherein the cutting device comprises rolling means connected to the body part and to the gripping means in vertical direction arranged to pairs one upon the other, and the circling movement of the cutting device as to the pile to be cut is generated by operation of the rolling means.

5. The cutting device according to the claim 1, wherein the cutting device comprises detectors arranged to the cutting device in order to determine sawing depth of the sawing means.

6. The cutting device according to the claim 1, wherein the cutting device comprises hydraulic means, pneumatic means, or at least one electric motor as means for operating the sawing part and/or the sawing means of the sawing part.

7. The cutting device according to the claim 1, wherein the cutting device comprises a hydraulic cylinder for generating different positions of the gripping means.

8. The cutting device according to the claim 1, wherein the cutting device comprises a cooling arrangement to cool sawing means of the sawing parts during sawing.

9. A method for cutting a pile, in which method is connected a cutting device to an excavator, is driven the cutting device around the pile to be cut, is obtained a grip from the pile to be cut by gripping parts to hold on to the pile, and is released the gripping means from said grips, wherein the method
is used sawing means on both sides of an angular shaped pile to be cut arranged to move to a sawing position and from the sawing position to a secure position, and in the method is performed sawing operation by the sawing means of the cutting device when the sawing means are in the sawing position by moving the sawing means to reciprocating motion essentially horizontally as to the pile to be cut and longitudinally as to the gripping parts by adapting by utilizing elastic means to forces, which arises during the sawing movement of the sawing means in order to prevent the sawing means from damaging, and in the method is accomplished also sawing movements which deviate from the longitudinal sawing movements, and is obtained a pressure force of the grip from the pile by said gripping parts to move the cut pile part away.

10. The method for cutting a pile according to claim 9, wherein the method is determined diameter of the pile to be cut and is changed distance between the gripping parts suitable for the diameter of the pile to be cut.

11. The method for cutting a pile according to claim 9, wherein the motion of the cutting device or of part of the cutting device as to the pile is circling motion of the cutting device or of part of the cutting device round the pile to be cut.

12. The method for cutting a pile according to claim 11, wherein the method is connected rolling means to the body part and to the gripping means in vertical direction arranged to pairs one upon the other, and is generated by operation of the rolling means the circling movement of the cutting device as to the pile to be cut.

13. The method for cutting a pile according to claim 9, wherein the method is determined sawing depth of the sawing means by detectors.

14. The method for cutting a pile according to claim 9, wherein the method the sawing part and/or the sawing means of the sawing part are being operated by hydraulic means, pneumatic means, or at least one electric motor as means for operating the sawing part and/or the sawing means of the sawing part.

15. The method for cutting a pile according to claim 9, wherein the different positions of the gripping means are generated hydraulically.

16. The method for cutting a pile according to claim 9, wherein the sawing means are cooled during sawing.

* * * * *

UNITED STATES PATENT AND TRADEMARK OFFICE
CERTIFICATE OF CORRECTION

PATENT NO. : 9,109,339 B2
APPLICATION NO. : 14/390860
DATED : August 18, 2015
INVENTOR(S) : Teppei Morimoto et al.

It is certified that error appears in the above-identified patent and that said Letters Patent is hereby corrected as shown below:

Claims

Column 13, Line 47, Claim 2:

After "according to"
Delete "the"

Column 13, Line 51, Claim 3:

After "according to"
Delete "the"

Column 13, Line 55, Claim 4:

After "according to"
Delete "the"

Column 13, Lines 58 - 59, Claim 4:

After "vertical direction arranged"
Delete "to" and
Insert -- in -- pairs

Column 13, Line 61, Claim 5:

After "according to"
Delete "the"

Signed and Sealed this
Nineteenth Day of January, 2016

Michelle K. Lee
*Director of the United States Patent and Trademark Office*

CERTIFICATE OF CORRECTION (continued)
U.S. Pat. No. 9,109,339 B2

Claims

Column 14, Line 1, Claim 6:

After "according to"
Delete "the"

Column 14, Line 5, Claim 7:

After "according to"
Delete "the"

Column 14, Line 8, Claim 8:

After "according to"
Delete "the"

Column 14, Line 46, Claim 12:

After "vertical direction arranged"
Delete "to" and
Insert -- in -- pairs